No. 744,228. PATENTED NOV. 17, 1903.
J. PEELLE.
TOOL.
APPLICATION FILED JAN. 22, 1903.
NO MODEL.

Witnesses,
D. Mahlon Unger
John D. Sherwood

Inventor,
John Peelle,
By Joseph A. Minturn,
Attorney.

THE NORRIS PETERS CO., PHOTO-LITHO., WASHINGTON, D. C.

No. 744,228.                                    Patented November 17, 1903.

UNITED STATES PATENT OFFICE.

JOHN PEELLE, OF INDIANAPOLIS, INDIANA.

TOOL.

SPECIFICATION forming part of Letters Patent No. 744,228, dated November 17, 1903.

Application filed January 22, 1903. Serial No. 140,093. (No model.)

*To all whom it may concern:*

Be it known that I, JOHN PEELLE, a citizen of the United States, residing at Indianapolis, in the county of Marion and State of Indiana, have invented certain new and useful Improvements in Tools, of which the following is a specification.

This invention relates to improvements in tool-holders for use on lathes and other metal-working machinery, and the object is to provide a holder or body portion in which a series of interchangeable cutting ends or tools may be secured, thereby saving time of adjusting the tool after each change.

The object also is to economize in the material used, as the removable cutting ends require a very small amount of metal as compared with the body portion in which it is held and on account of the greatly-reduced bulk much economy in room is effected by my invention.

I accomplish the objects of the invention by the mechanism illustrated in the accompanying drawings, in which—

Figure 1:
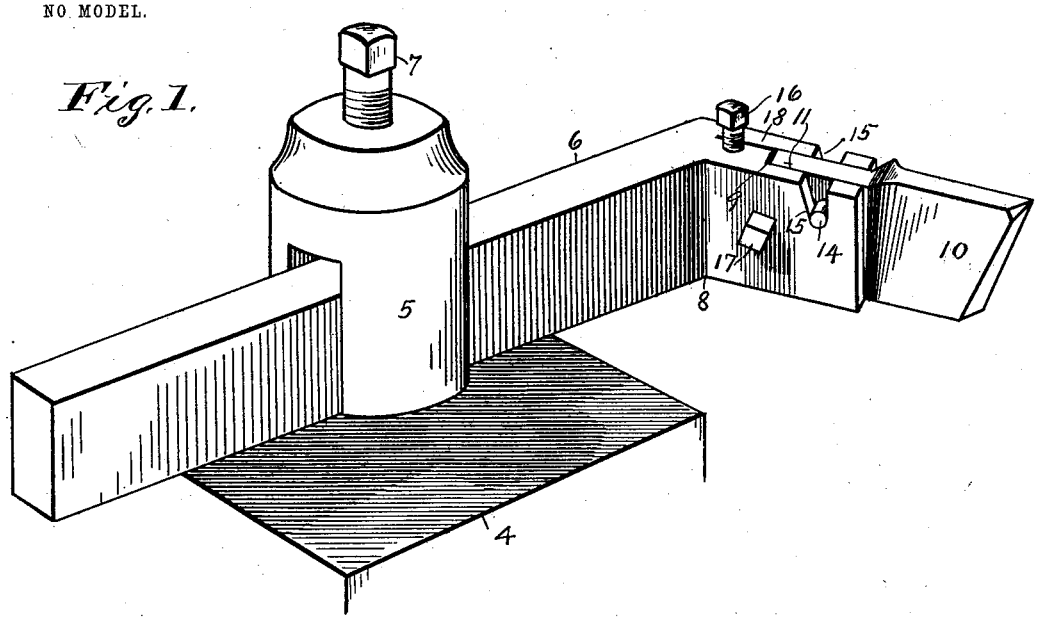
Figure 2:
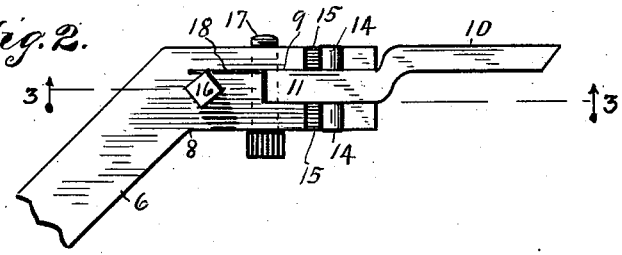

Figure 1 is a perspective view of my invention in operative position; Fig. 2, a detail in top plan view of the outer end of the holder with tool in place, and Fig. 3 a vertical section on the line 3 3 of Fig. 2.

Like characters of reference indicate like parts throughout the several views of the drawings.

Figure 3:
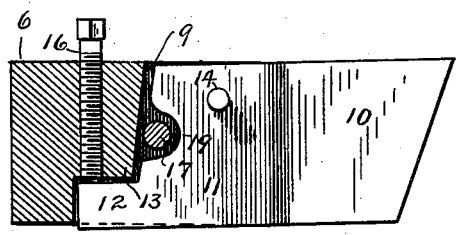

4 is the slide-rest of a lathe, 5 the tool-post, of usual construction, and 6 the tool-holder, which is held in the tool-post in the usual manner by means of the set-screw 7. The front end of the tool-holder may be bent at 8 in the usual manner or it may be straight. It has a vertical slot 9 extending in from the end of the bent portion to receive the shank 11 of the cutting-tool 10. The lower portion of the shank will be continued back to form the tongue 12, and an extension of the slot 9 will be formed to receive this tongue and form the shoulder 13, as shown in Fig. 3. The shank 11 will make a close fit in the slot 9. The outer end of the tool will be held from dropping down by the lateral lugs 14 14, which project from opposite sides of shank 11 and rest at the bottoms of the notches 15 15 of the bifurcated end of the holder. The drawings show a pin secured in a perforation of the shank 11 with ends projecting on both sides of the shank to form the lugs; but the lugs might be integral parts of the shank.

An adjustment of the outer end of the tool will be had by means of the screw 16, which passes through a screw-threaded hole in the holder and bears against the tongue 12. The two parts of the bifurcated end of the holder will be drawn together by means of the screw 17, the requisite elasticity being secured by means of the saw-kerf 18. The mid-end of the shank is cut out at 19 to avoid interference between the shank and screw 17.

To change tools, as from a cut-off to a facing tool or from either of these to a thread-cutting tool and the like, it is only necessary to loosen the screw 17, lift out the tool just used, replace it with the one to be used, and after adjusting its point by means of the screw 16 clamp it firmly in place by means of the screw 17.

Having thus fully described my invention, what I claim as new, and wish to secure by Letters Patent, is—

1. A tool-holder having its end slotted longitudinally and having the side members formed by said longitudinal slot notched transversely from their upper edges, a tool having a shank seated in said longitudinal slot, said shank having lateral lugs which are seated in the said transverse notches, and means for preventing the rotation of the outer end of the tool around said lugs.

2. A tool-holder having a longitudinally split end, the side members formed by said longitudinal split having top transverse notches, a tool having a shank to enter the transverse split in said holder said shank having side lugs to enter the transverse notches of the said members adjacent to said split and said shank having a portion which underlies the holder at the inner end of the split.

3. A tool-holder having a longitudinally split end to receive the shank of a tool and having a narrower slot continuation, a screw to draw the members on each side of the split together, said members having indentations extending downwardly from their top edges, a set-screw adjacent to the end of the split made for the shank of the tool, a tool having a shank to enter the split in the holder, said shank having an under side extension to bear against the last-mentioned set-screw and said shank having side lugs to enter the indentations in said side members.

4. In a tool to be used with a holder having a longitudinal slot and transverse notches in said slotted members, said tool having a shank to fit the longitudinal slot of the holder and said shank having lateral lugs to enter the holder-notches, and having a tongue extended rearwardly of the lower edge of said shank.

5. A tool to be used with a holder having a longitudinal slot and transverse notches in said slotted members, having a shank to fit the longitudinal slot of the holder, a tongue extension from the inner end of the shank, lateral lugs to enter the holder-notches and a cut-away portion between the tongue and the lateral lugs.

In witness whereof I have hereunto set my hand and seal, at Indianapolis, Indiana, this 14th day of January, A. D. 1903.

JOHN PEELLE. [L. S.]

Witnesses:
J. A. MINTURN,
JOHN B. SHERWOOD.